H. J. BUCK.
ELEVATOR.
APPLICATION FILED OCT. 23, 1914.

1,140,110.

Patented May 18, 1915.
2 SHEETS—SHEET 1.

WITNESSES

INVENTOR
HERMAN J. BUCK
BY Paul & Paul
ATTORNEYS

H. J. BUCK.
ELEVATOR.
APPLICATION FILED OCT. 23, 1914.

1,140,110.

Patented May 18, 1915.
2 SHEETS—SHEET 2.

WITNESSES

INVENTOR
HERMAN J. BUCK
BY Paul & Paul
ATTORNEYS

UNITED STATES PATENT OFFICE.

HERMAN J. BUCK, OF ELLWOOD CITY, PENNSYLVANIA, ASSIGNOR TO MATHEWS GRAVITY CARRIER COMPANY, OF ELLWOOD CITY, PENNSYLVANIA, A CORPORATION OF PENNSYLVANIA.

ELEVATOR.

1,140,110.  Specification of Letters Patent.  Patented May 18, 1915.

Application filed October 23, 1914. Serial No. 868,159.

*To all whom it may concern:*

Be it known that I, HERMAN J. BUCK, a citizen of the United States, and resident of Ellwood City, in the county of Lawrence and State of Pennsylvania, have invented certain new and useful Improvements in Elevators, of which the following is a specification.

My invention relates to elevators designed particularly for use in connection with gravity carriers to receive packages on one floor or level, and elevate or lower them for delivery on another floor or level.

The general type of elevator to which my improvement relates is that shown and described in the patent issued to A. S. Dehler, No. 1,020,746, March 19, 1912.

My present invention consists generally in mechanism arranged between the inner ends of the gravity carrier bars, and bridging the space between the wheels or rollers on said bars, through which the movable carriage must pass, this means preventing small packages from dropping into the space between the wheels of the carrier bars.

The invention consists further in the constructions and combinations hereinafter described and particularly pointed out in the claims.

Figure 1:
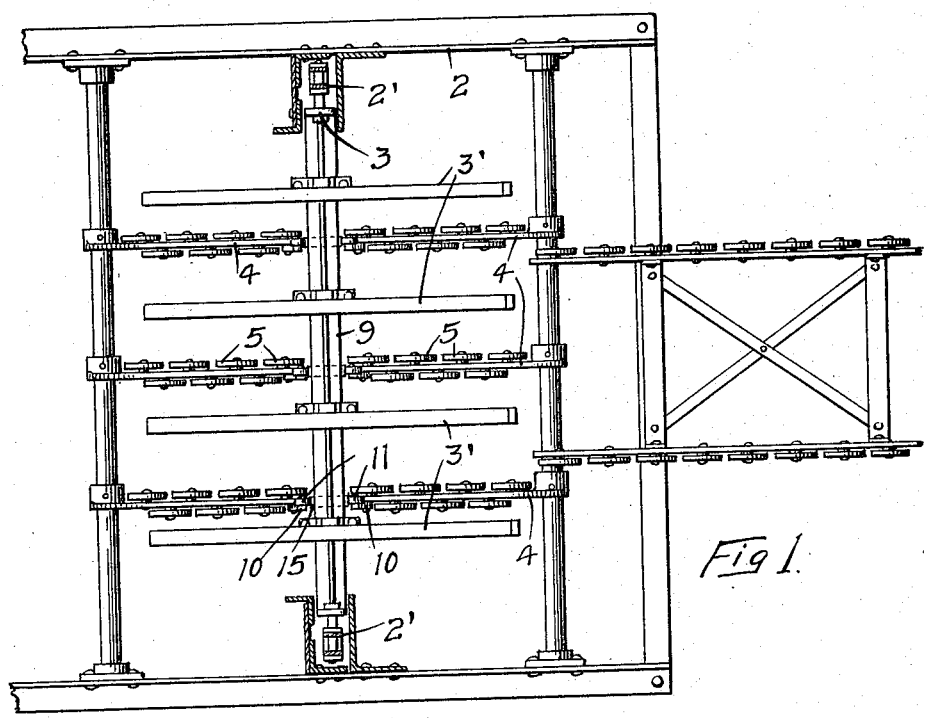
Figure 2:
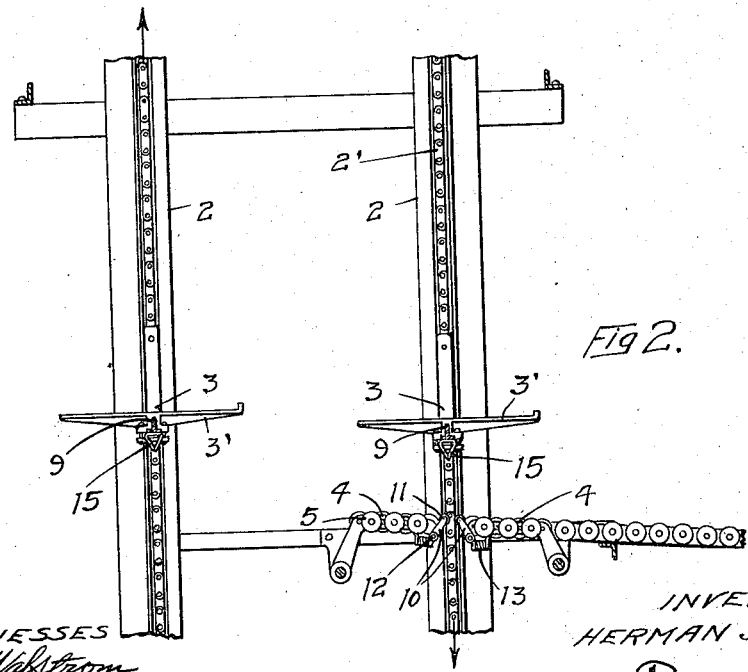
Figure 3:
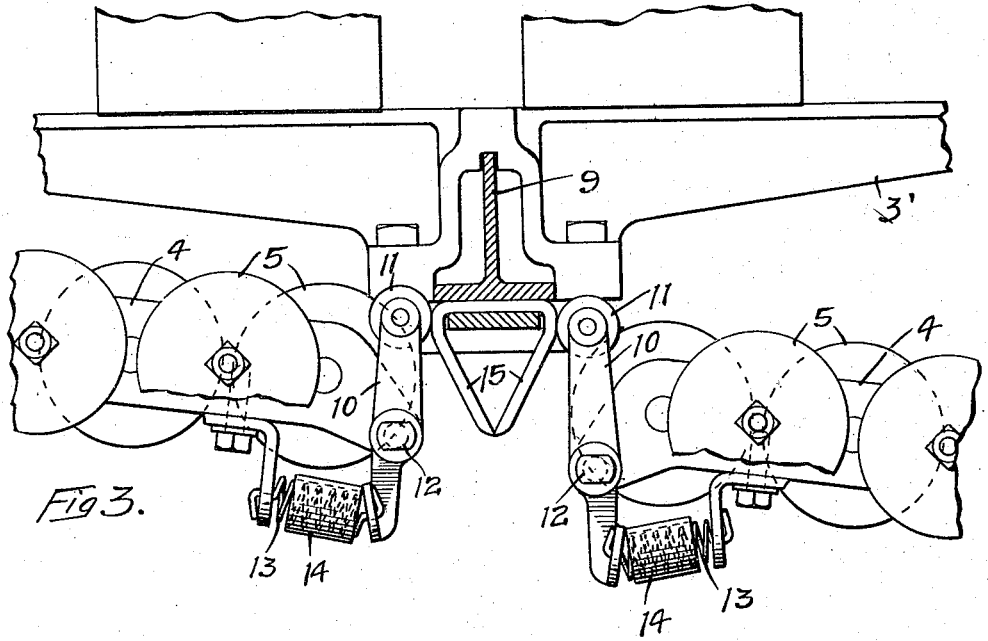
Figure 4:
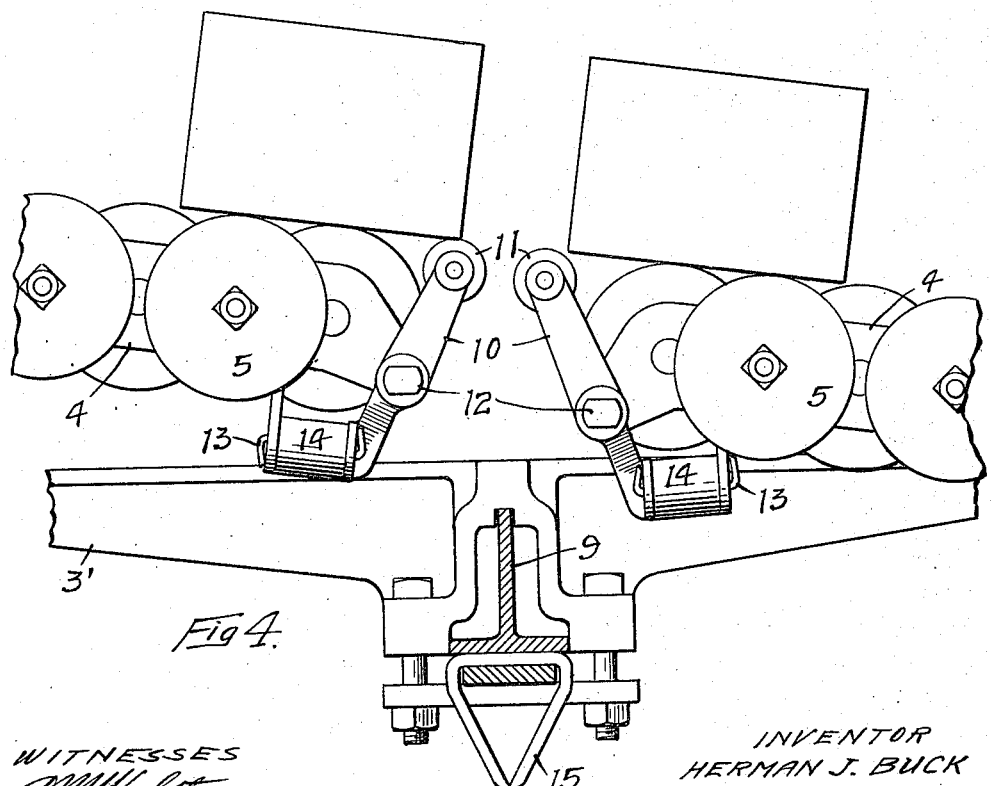

In the accompanying drawings forming part of this specification, Figure 1 is a sectional plan view of an elevator embodying my invention, Fig. 2 is a vertical sectional view of the same, Figs. 3 and 4 are detail views illustrating my invention.

In the drawings, 2 represents a portion of the elevator frame which is provided with endless chains or belts 2' having a series of vertically moving carriages 3, by which articles received at one side of the elevator are carried upwardly and across the elevator and then downwardly upon the opposite side thereof and delivered at any desired floor or level upon stationary gravity carrier bars.

The general arrangement of the parts of the elevator is shown in the patent to Dehler, No. 1,020,746, and need not be particularly recited herein.

At each floor or level where it is, or may be, desired to remove packages from the elevator, gravity carrier bars 4, 4 are arranged, projecting inwardly, and each of said bars is provided with a series of small wheels 5, preferably alternately arranged and mounted upon anti-friction bearings. The carriage 3, the platform of which consists of a series of bars, moves downward between the gravity carrier bars, and thereby packages arranged upon said carriage will be deposited upon said gravity carrier bars and will automatically move out of the elevator, traveling over said wheels.

The vertically movable carriage consists preferably of a series of carrier bars 3' secured on a cross T-bar 9. The ends of the gravity carrier bars must be separated a sufficient distance to permit this T-bar to pass between them. This, in the usual construction, leaves a space between the wheels, at the ends of the gravity carrier bars, into which small packages may drop, or into which one corner of such packages may drop, thereby holding said packages on the bars and preventing them from moving by gravity out of the elevator. If a package is held in this position it will be struck or crushed or broken by the next downwardly moving elevator carriage. I obviate this difficulty by providing at the end of each gravity carrier bar a movable and preferably pivoted arm 10, carrying a wheel 11, said arm being pivoted at 12 to the end of the adjacent gravity carrier bar. A tension spring 13 engages the end of each arm and tends to hold the upper ends of said arms and the wheels carried thereby toward each other. Sleeves 14 on said springs form a stop to limit the inward movement of said arms. The result of this is that the wheels 11 will normally occupy the space between the wheels at the ends of the gravity carrier bars and will thus prevent packages from falling into the space between said wheels.

For the purpose of separating the wheels 11 when the carriage moves downwardly, a wedge-shaped projection 15 is provided on the under side of the T-bar of the carriage. This projection passes between the wheels 11 and separates them and permits the T-bar to pass between them (see Fig. 3). As soon as the T-bar has passed the wheels, said wheels move back into their normal position and engage the under side of the package or article that is held by the descending carriage (see Fig. 4). I also prefer to provide wheels 5 upon both sides of the gravity carrier bars 4, and to space said wheels alternately so that the center of each wheel, upon one side of the bar, is substantially opposite the space between the circumferences of the wheels upon the other side of the bar, as shown in the drawings.

The details of the construction may be varied in many particulars without departing from my invention.

I claim as my invention:

1. The combination, with an elevator provided with a movable carriage, and with gravity carrier bars extending into said elevator and arranged with spaces between their ends permitting the passage of said carriage, of movable wheels or rolls arranged in the spaces between the ends of said bars, substantially as described.

2. The combination, with an elevator provided with a movable carriage, and with gravity carrier bars extending into said elevator and arranged with spaces between their ends permitting the passage of said carriage, of movable wheels or rolls arranged in the spaces between the ends of said bars, and means provided upon said carriage for moving said wheels or rolls out of the path of the carriage, substantially as described.

3. The combination, with an elevator provided with a movable carriage and with gravity carrier bars extending into said elevator and arranged with spaces between their ends permitting the passage of said carriage, of movable wheels or rolls arranged in the spaces between the ends of said bars, means provided upon said carriage for moving said wheels or rolls out of the path of the carriage, and means for returning said wheels or rolls to their normal position, substantially as described.

4. The combination, with an elevator, provided with a movable carriage and with gravity carrier bars extending into said elevator, and arranged with spaces between their ends permitting the passage of said carriage, of supporting means arranged between the ends of said bars and adapted to hold small articles that may be deposited upon said carriage, and means upon said carriage for moving said supporting means out of the path of the carriage.

5. The combination, with an elevator provided with a movable carriage, and with gravity carrier bars extending into said elevator and arranged with spaces between their ends permitting the passage of said carriage, of supporting means arranged between the ends of said bars, and adapted to hold small articles that may be deposited upon said carriage, means upon said carriage for moving said supporting means out of the path of the carriage, and means for restoring said supporting means to normal position.

In witness whereof, I have hereunto set my hand this 3rd day of September 1914.

HERMAN J. BUCK.

Witnesses:
Jos. W. Humphrey,
L. G. Tingwall, Sr.